June 24, 1958     J. C. FROMMER     2,840,721
DETECTION DEVICE FOR MOVING WEBS

Filed May 28, 1954     3 Sheets-Sheet 1

INVENTOR
JOSEPH C. FROMMER
BY Kenneth Swartwood
ATTORNEY

INVENTOR
JOSEPH C. FROMMER
BY Kenneth Swartwood
ATTORNEY

INVENTOR.
JOSEPH C. FROMMER
BY Kenneth Swartwood
ATTORNEY

United States Patent Office 2,840,721
Patented June 24, 1958

2,840,721

DETECTION DEVICE FOR MOVING WEBS

Joseph C. Frommer, Cincinnati, Ohio, assignor, by mesne assignments, to Electric Eye Equipment Company, Danville, Ill., a corporation of Illinois Application May 28, 1954, Serial No. 433,230

11 Claims. (Cl. 250—219)

This invention relates to the detection of the lateral position of a printed web moving in a machine performing certain operations on it. It particularly relates to a device for detecting the lateral position of the edge of the printing on a continuous web of paper or similar material. The expression "detection" is used to denote the generation of signals indicative of the object of said detection. Thus detection of the lateral position of a web is to denote the generation of signals indicative of said lateral position for the purpose of indicating, recording, or controlling said lateral position, or, more broadly, to provide intelligence for any desired operation which is desired to be performed in a different way for different lateral positions of said web.

One object of the invention is to indicate to the operator how far the lateral position of the printing deviates from a certain desired position at a certain point of the machine.

Another object of the invention is to correct deviations of the lateral position from the desired lateral position.

A further object of the invention is to perform the above tasks without the aid of special registration marks.

A further object of the invention is to detect the off register independently from the speed of the web.

A still further object of the invention is to detect the off register independently from variations of circuit components.

Further objects and advantages of the invention will be apparent in connection with its description.

The invention comprises the step of detecting the reflection of light from certain portions of said web with the aid of a photoelectric system on which said portion of said web is imaged. This photoelectric system can be a phototube with a mask in front of it or some other light sensitive system having a light sensitive surface of convenient shape. As the web passes in front of the photoelectric system different recurrent portions of the printing will appear imaged on said mask or said light sensitive surface. According to the reflective properties (distribution of reflection as on glossy against shiny surfaces, color, darkness of printing, etc.) of the various portions of the web, the photoelectric signals in said photoelectric system will vary. The part of the web comprising all the portions imaged on the photoelectric system will be referred to as the inspected track of the web. By lateral movement of the photoelectric system, the inspected track may be shifted. When the inspected track comprises the lateral edge of a printed pattern or of the web backed by a part of the machine having different reflective properties therefrom during the passage of certain patterns, small lateral movements of the web cause substantial changes of the photoelectric signal during the passage of said patterns. The period of the passage of such edges of patterns are referred to as "informative period." When the inspected track comprises portions unprinted both in and right and left from the track, small lateral movements of the web cause no change in the photoelectric signals. Laterally uniform printing or a portion of the edge of the web backed by a portion of similar reflective properties of the machine has the same effect. The period of the passage of such a portion of the track is referred to as a "reference period."

According to the invention, a track comprising both informative and reference portions is inspected. In a preferred embodiment unprinted portions are used as reference portions. The photoelectric signals obtained during an informative period are compared to the photoelectric signals obtained during a reference period and the result of this comparison contains the information regarding the lateral position of the web.

Comparing the photoelectric signal obtained from an informative portion with a photoelectric signal obtained from a reference portion of the web has the following advantage:

The photoelectric signal obtained from a portion having on it a certain amount of printing varies considerably with changes in the intensity of the illumination of the track, accumulation of dust or spray on the optics, changes of sensitivity of the phototube, change in the static characteristic of the amplifier used, and so forth. All these factors influence the magnitude of the photoelectric signal obtained from the reference portions in the same direction and most of the factors influence it in the same proportion as the photoelectric signal obtained from the informative portions. Therefore comparison of these signals against each other gives far more reliable information than the photoelectric signals obtained during the informative periods taken by themselves.

As a numerical example, let us assume that at the time of first installation a white, unprinted portion causes a photoelectric signal of 100 units, and a certain printing causes a signal of 50 units. An automatic control can then be set up so as to keep the inspected track half printed and half unprinted during the informative periods, asking for 75 units during these periods. If now dust, splash, aging of lamp, etc., reduces the light reading of the phototube to, say, 60% of the original value, then a white portion causes a signal of 60 units and said printing causes a signal of 30 units.

Accordingly, with a system based solely on the signal from an informative period, the system drives the web toward the unprinted side, and would never stop, since even entirely unprinted portions would give less than the asked for 75 units.

If now, according to the invention, the signals of informative periods are compared with the signals of reference periods, then at the time of its setup an adjustment is made to have a difference of 25 units between the 75 units of informative portions half printed and the 100 units of entirely white reference portions. When the photoelectric signal has dropped to 60% of the original values, entirely white web gives 60 units, entirely printed web 30 units, and a difference of 25 units is achieved if the reference portion gave 60—25=35 units corresponding to ⅙ unprinted, ⅚ printed. If the inspected track is narrow, say .030" wide, then the deviation of printing going to the center of the .030" track (.015" from one edge) and to ⅙ of this .030" from one edge (.005" from one edge) is acceptable for certain purposes.

According to a preferred embodiment of the invention, even this error can be eliminated. In this embodiment the signals from the informative period are compared with signals from the reference period not by subtracting these signals, but rather by dividing these signals with each other. If then at the first setup an adjustment is made to obtain during informative periods 75 units for the midpoint between 100 units (for white) and 50 units (for fully printed portions), then after the aging and darkening the device calls for 75/100 of the now 60 units obtained in the reference periods, or 45 units. These 45 units are obtained exactly at the midpoint between white paper (60 units) and fully printed paper (30 units) at reduced light, so that the loss of light does not impair the automatic adjustment at all.

If informative periods and reference periods alternate in such a way that there is no such period in between that interferes with their comparison, and if it is not necessary to provide for uniform operation over a wide range of web speeds, then quite simple circuits can be used. Signals from unwanted portions (e. g., from fully printed portions in a track where printing up to the middle of the track is seen in the informative periods and white paper is seen in the reference periods by the phototube) are suppressed by monitoring means driven by the machine printing said patterns or controlled by some photoelectric means off suitable portions of said patterns.

Such monitoring means also can be used to establish the length of cycles comprising at least one informative period and at least one reference period so that comparison is repeated for each such cycle equally at high speeds of the web and low speeds of the web.

If indication or recording of the lateral position of the web is desired, then it is preferable to have the information gained from comparing the signals from latest informative periods to reference signals until the reoccurrence of a new informative period.

If the lateral position of the web is to be controlled from the device according to the invention, then it is possible to correct any deviation by keeping the controlling signal on for a duration of time proportional to said deviation. To do this, the output is applied to storing means and these storing means are discharged at a certain rate so as to obtain a short duration of these signals on these storing means for small signals and a long duration for large signals.

For a clearer understanding, the invention is now described in connection with the drawings in which.

Figure 1:
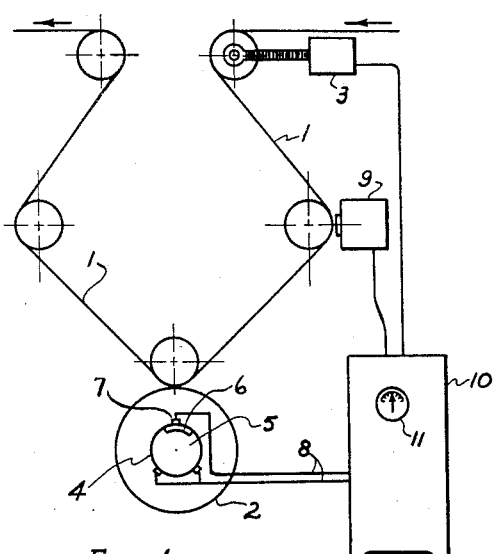
Figure 1 is a schematic view of a portion of a printing press with blocks indicating the parts pertaining to the present invention.
Figure 3:
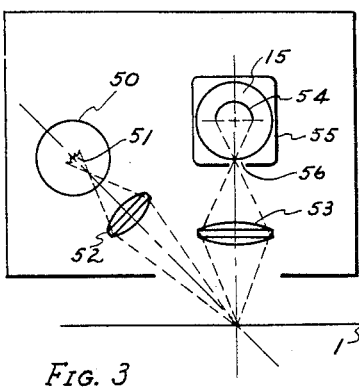
Figure 3 shows schematically the photoelectric scanner used as known in the art.

Referring to Figure 1, 1 denotes the web, 2 a printing cylinder printing some patterns on said web, 3 symbolizes a correcting mechanism for adjusting the lateral position of the web by shifting the angular position of at least one pivoted guiding cylinder as known in the art, 4 is a commutator comprising a conducting portion 5 and an insulating portion 6. 7 is a brush and 8 denotes leads which are in electrical contact with each other whenever the conducting portion 5 passes under brush 7. 9 is a photoelectric scanner the details of which are shown schematically in Figure 3. 10 represents a main amplifier with a meter 11 for the indication of the "off" register.

Figure 2:
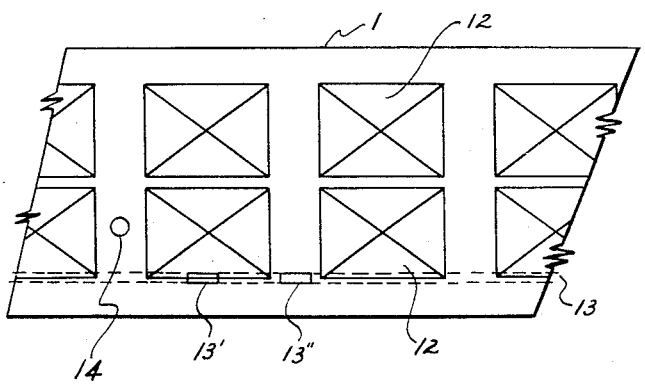
Figure 2 shows schematically a portion of printed web with an inspected track.

In Figure 2: 1 is the printed web as in Figure 1 and 12 represents printing on it. The scanner inspects track 13 of the web. 13' shows a portion of this track seen during an informative period and 13" shows a portion seen during a reference period. The phototube sees a relatively long dimension in the direction of the web travel, say ½", and a relatively short dimension in the lateral direction, say .030". The drawing shows the web in perfect lateral register. It is seen that if the web should be off register by more than .015" to one side, the phototube sees a completely printed portion, and if the web would be by .015" off to the other side, the phototube 15 sees completely unprinted paper during passage of printing 12 under it; i. e., during the informative period. It should also be noted that there will be a position of the web in which the phototube sees an entirely unprinted portion 13" of paper in whichever direction the web is out of register. This portion will serve as reference portion. 14 represents a portion of the web outside the inspection zone. A second scanner placed in front of such a portion of the web may also monitor the cycles of informative and of reference periods if such monitoring is desired off the printed web.

Figure 3 shows schematically the essential parts of a photoelectric scanner. 50 represents a lamp having a filament 51. The light of filament 51 is concentrated by a lens 52 on the web 1. The phototube 15 having a light sensitive surface 54 is enclosed in a shield 55 having in it a narrow rectangular hole 56, to be called mask. A second lens 53 forms an image of the illuminated portion of web 1 in the plane of mask 56, so that the phototube 15 sees a portion of said mask similar to the shape of mask 56.

When a photosensitive transistor of the shape and size of mask 56 placed in its place is used, it dispenses with the necessity of a separate mask.

Figure 4:
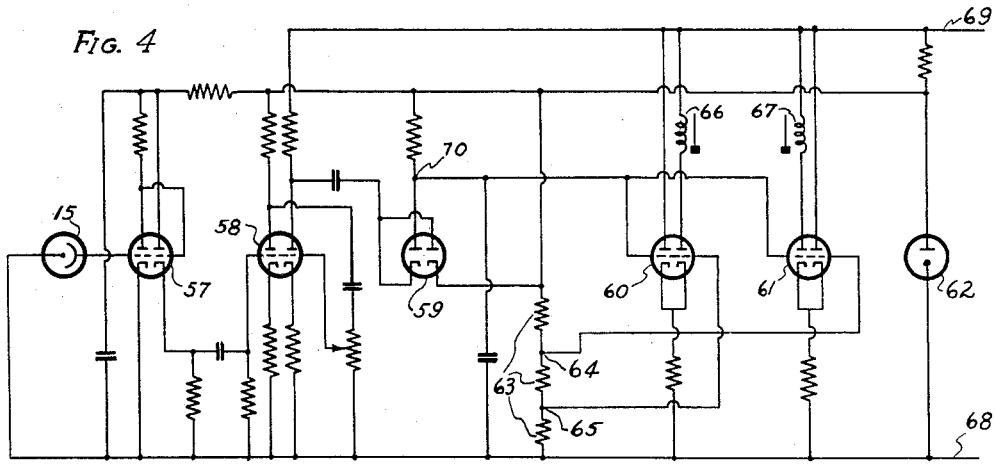
Figure 4 shows a circuit diagram for use in connection with webs having no printing on them that would interfere with the comparison between informative and reference portions.

Figure 4 represents a circuit diagram used in a simple embodiment of the invention. This embodiment makes no use of the commutator 4 and the meter 11 of Figure 1, and therefore these elements are dispensed with in this embodiment. In this figure, 15 represents a phototube, 57, 58 twin triodes, say of the type 12AT7, 59 a twin diode, say of the type 6AL5, 60 and 61 twin triodes, say of the type 12AU7, and 62 a voltage regulator tube, say of the type OD3. 68 indicates the reference line of the amplifier. 63 is a voltage divider keeping points 64 and 65 at, say, plus 100 volts and plus 50 volts, respectively, with respect to line 68. Line 69 is held at say plus 300 volts with respect to line 68 by some conventional power supply, not shown.

Phototube 15 is placed in front of a track of the web having both informative and reference sections, the former being the lateral edge of some printed pattern, the latter being either completely printed or completely unprinted portions. In this embodiment of the invention, it is necessary that all portions of the inspected track outside the informative portion provide the same reference signal level.

The phototube current of tube 15 assumes a first level during the informative periods and a second level during the reference periods. The alternation between these signal levels is amplified in tubes 57 and 58, rectified in twin diode 59, and causes anode 70 of 59 to assume a corresponding voltage. If this voltage is substantially above the 100 volts of point 64, then tube 61 energizes relay 67 causing correction in one direction. If this voltage is substantially below the 50 volts of point 65, then tube 60 causes relay 66 to make correction in the opposite direction. If this voltage is substantially between the 50 volts of point 65 and the 100 volts of point 64, then both relays remain de-energized.

The voltage on plate 70 governs the action of relays 66, 67 in the following manner: each of these relays is connected to one anode of a twin triode having its two cathodes interconnected. These anodes will draw current if the pertinent grids are at a higher voltage than the grids pertaining to the other anodes of the twin triodes; and will not draw current if the pertinent grids are at a lower voltage than the opposing grids. Anode 70 of tube 59 is connected to the grid of tube 61 controlling the current through relay 67 but to that grid of twin triode 60 which opposes the grid controlling the current through relay 66.

It will be noticed that no bias is provided for the first half of tube 57 and that the photocurrent of 15 flows across the grid to cathode path of this first system. In this way, as explained in Patent No. 2,517,554, the output signal will be a function not of the difference but rather of the ratio between the upper and lower value of photocurrent so that errors due to changes in level of illumination, dust, and splash, etc., are eliminated.

Figure 5:
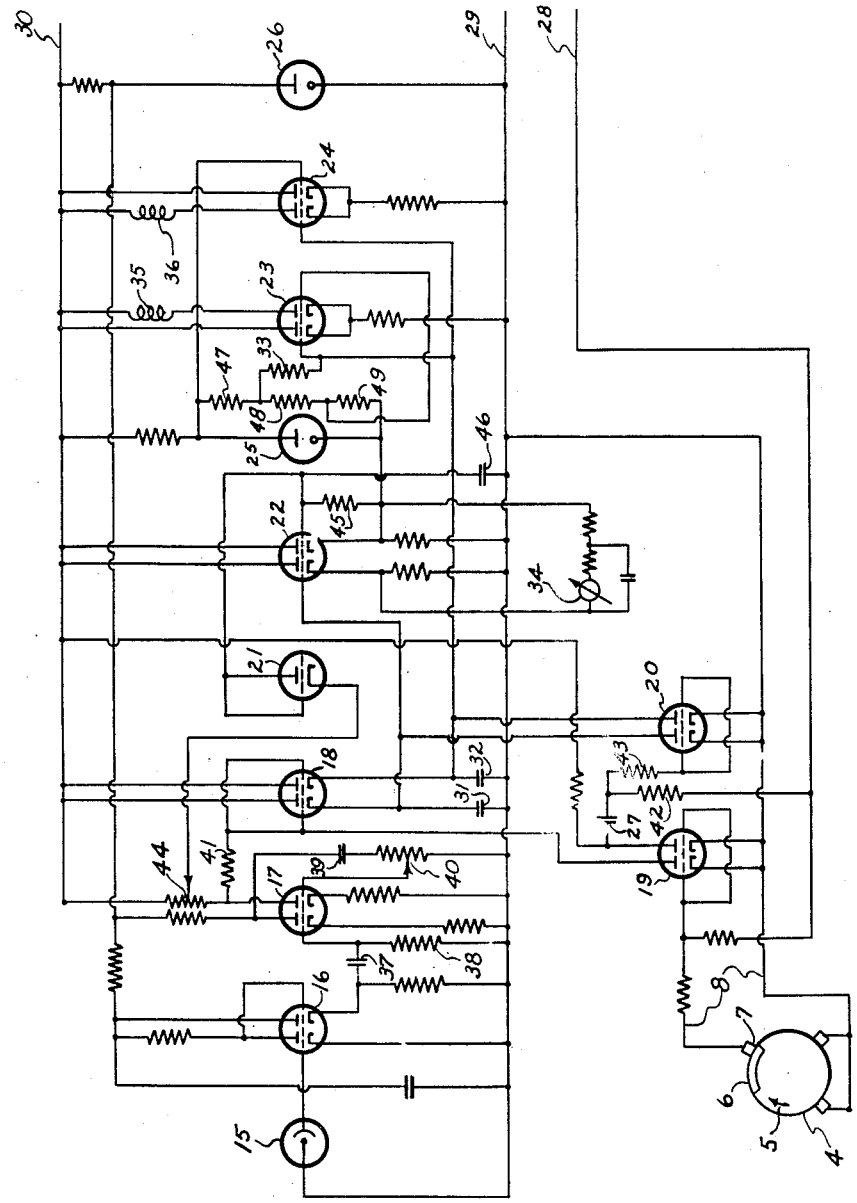
Figure 5 shows an alternative circuit diagram provided with means for the suppression of signals from such portions of the inspected track as would interfere with comparison between informative and reference portions.

A circuit usable with tracks containing such other printing as could interfere with information gathered from the informative and the reference portions in the above embodiment is shown in Figure 5. In this figure, 15 is the phototube, 16, 17, 18, 19, and 20 are the twin triodes, say of the type 12AT7, and 22, 23 and 24 are twin triodes, say of the 12AU7 type, 21 is a triode connected as a diode, 25 and 26 are voltage regulating tubes keeping a constant voltage of, say, 75 and 150 volts across their terminals respectively. A power supply, not shown, provides a positive voltage of, say, 300 volts on terminal 30 and negative voltage of, say, 100 volts on terminal 28 with respect to the reference terminal 29. 4 is the commutator of Figure 1 with a conducting portion 5 and an insulating portion 6, a brush 7 and leads 8 to the amplifier.

31 and 32 are capacitors of, say, .01 mf., 40 and 44 are volume controls, 34 is a meter of, say, 1 ma. full scale sensitivity, 35, and 36 are relays, their contacts not being shown. A number of resistors and capacitors are designated in the standard way and will be mentioned in connection with their function.

The photoelectric signal originating in phototube 15 is amplified in tubes 16 and 17, so as to obtain at the second anode of 17 a signal similar in wave shape with the signal provided by phototube 15 but amplified in voltage. As in the case of the circuit of Fig. 4 the first tube 16 has no bias on the grid of its first section and hence the output is a function of the ratio between upper and lower values of phototube current.

The time constants of 37, 38 and 39, 40 are so chosen that even at the slowest speed of the press, this signal is faithfully reproduced. In a particular instance, 2 mf. for capacitors 37 and 39, 4.7 megohms for 38 and 2 megohms for 40 resulting in a time constant of $2 \times 4.7 = 9.4$ seconds on the first grid of tube 17 and of $2 \times 2 = 4$ seconds on the second grid of tube 17, were successfully used.

The grids of tube 18 are connected through resistor 41 (of, say, .47 megohm) to the second plate of tube 17 and also directly to the first plate of tube 19. This tube 19, as well as the operatively connected tube 20 and commutator 4 serve as a monitoring system to monitor the passage of the informative portions of the web. The commutator 4 is so adjusted that its insulating portion 6 gets under the brush when the phototube sees the informative portion 13' of Figure 2; i. e., that portion where small lateral displacement of the web causes the phototube to see substantially more or less printed paper. In this position of the commutator, tube 19 is in cut-off due to the bias applied to it from line 28. Therefore the grids of 18 faithfully assume the voltage impressed on them by the second plate of 17. As soon as the insulating portion leaves the brush, the conducting portion 5 brings the grids of tube 19 substantially to zero potential and, therefore, the first plate of tube 19 keeps the grids of tube 18 at a low potential, irrespective of the voltage on the second plate of tube 17. Thus the grids of tube 18 assume a substantially constant low voltage during the passage of the conducting portion 5 under the brush 7, whilst during the passage of the insulating portion 6 a voltage that will be the higher, the more printing the phototube sees. By proper adjustment of the control 40 this latter voltage may rise to, say, 150 volts for the phototube seeing completely printed paper. Through the cathode follower action of tube 18 both capacitors 31 and 32 will assume positive voltages as high as the grids drive them. When the grids go back to lower voltages, the voltage on 31, 32 can not follow them, since the current in tube 18 can flow only in one direction. In order to erase earlier information present on these capacitors, anodes of tube 20 are connected to them in such a way that current through tube 20 brings the voltage on these cathodes back to a low initial value. Such current is initiated for a very short duration each time the insulating portion 6 gets under the brush 7 through the positive signal impressed at this time on the second plate of tube 19 which is transmitted to both grids of 20 through capacitor 27 of, say, 100 micromicrofarads and resistors 42, 43 of 1 megohm each. In this way, the voltage on capacitor 31 undergoes the following cycle: at the moment when the insulating segment 6 reaches the brush 7, it is reset to a low initial value. Right after this, during the remaining part of the passage of the insulating segment 6 ("informative period"), the voltage increases to a value the higher the more printed paper the phototube sees during this period. From then, the voltage remains constant until the insulator 6 reaches the brush 7 again. The voltage on capacitor 32 undergoes a similar cycle except for the presence of resistor 33 which will be explained later.

The out of register is indicated on meter 34 which is connected, in series with resistors and a filtering network, across the cathodes of tube 22. One grid of 22 is connected to capacitor 31, its other grid is connected through diode 21 to the tap of voltage divider 44. This grid then assumes a voltage as negative as the second plate of 17 will go, except for the voltage drop on part of 44. Since the phototube sees at least in one position (13" during the "reference period") an entirely white web, diode 21 pulls the respective grid of 22 down to a voltage corresponding to this. The voltage drop along portion of 44 is introduced to compensate for the voltage difference between the grids and the cathodes of 18, so that when the phototube sees an entirely white web in the informative period the meter reads zero. The time constant of resistor 45 and capacitor 46 is chosen long enough so that the voltage applied during the passage of white portions shall be substantially stored for a full revolution even at lowest speed of the web. It shall, however, preferably be shorter than the time constant of 37, 38 and 39, 40, so that changes in minimum voltages be faithfully followed. It should also be noted that resistor 45 is connected to cathode rather than to a fixed potential and, therefore, the time constant of the system will be increased according to the amplification factor of tube 22.

If the unit shall not only indicate but also correct off register, this is accomplished by relays 35, 36, which are so connected to the control unit (3 of Figure 1) that one causes the web to move to the left and the other causes it to move to the right. These relays are connected, one each across the plates of tubes 23, 24, in such a way that 35 is actuated if the voltage on the first grid of tube 23 falls below the voltage of its second grid and 36 is actuated if the voltage on the first grid of 24 increases above the voltage on its second grid. These first grids are connected to capacitor 32 whereas the second grids are connected to a voltage divider 47, 48, 49 which lies across the voltage regulator tube 25. Cathode of 25 is connected to the second cathode of 22 so that 35 is actuated if the voltage on capacitor 32 is below the limit set by the voltage on the junction of 48, 49, and 36 is actuated if this voltage rises above the voltage set by the voltage on the junction of 47, with the anode of 25. Resistor 33 connecting capacitor 32 to the junction of resistors 47, 48 is provided to discharge this capacitor towards a voltage at which neither relay is being energized so that in case of deviation from the desired position we obtain, after the passage of each informative portion, a corrective signal of a duration the longer, the more the deviation from the desired position is.

In this embodiment phototube 15 is connected in a way similar to its connection in Figure 4 to obtain highest independence from dust, splash, aging, etc. But it should be understood that this feature may be omitted within the scope of the present invention.

When the edge of the web is to be inspected rather than the edge of a pattern printed on said web, the backing behind the web facing the photoelectric element is made to have reflective properties similar to those of the reference periods and contrasting those of the web for the informative periods.

Figure 6:
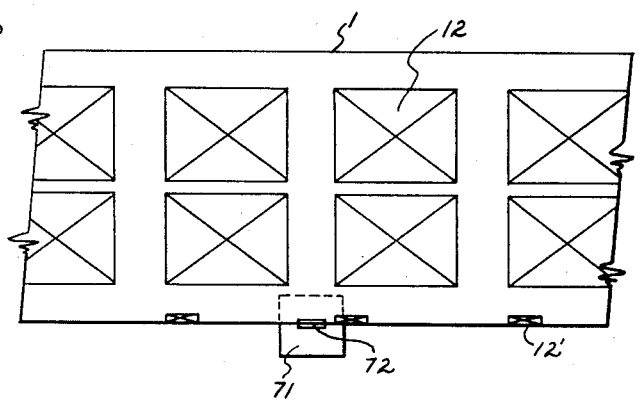
Figure 6 shows the web and a backing surface in an embodiment of the invention in which the printed edge of the web is used as the inspected track.

Fig. 6 represents a white web having on it a printed pattern 12 and another printed pattern 12' extending to the edge of the web. 71 is a white plate, say 2" x 2", fastened to the machine behind the web, facing the photoelectric element. 72 is the inspected portion. When unprinted portions of the edge of the web pass under the photoelectric element, it sees a white surface independently from the lateral position of the web. This is the reference period. If the printed portion passes in front of the photoelectric element, it sees the more printed surface the farther out the edge of the web runs, and in this way it generates electrical signals depending on the lateral position of the web in these informative periods.

Figure 7:
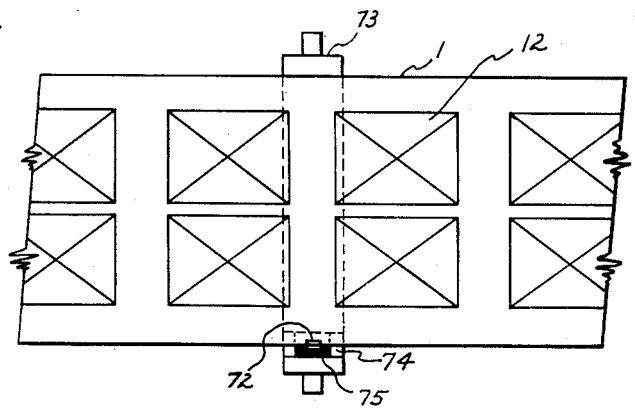
Figure 7 shows the web and a backing surface in an embodiment of the invention in which the unprinted edge of the web is used as the inspected track.

In Fig. 7, 1 represents a web having on it printed pattern 12 not extending to the edge of the web. 73 is a roller having on it a portion 74 painted to a color similar to that of the unprinted web and a portion 75 contrasting in color to said unprinted web. 72 is the inspected portion. As the web moves through the machine it pulls the roller along and brings alternatingly portions 74 and 75 in front of the photoelectric element, so that for part of the time the photoelectric signal is independent from the lateral position of the web and for part of the time it varies according to this lateral position.

Having now described my invention, I want it to be understood that changes, as for instance using scanners different from the one shown, using different circuits, such as circuits with a response dependent also from the rate of change of the output signal, adding, removing stages of amplification, and many other improvements or simplifications may be incorporated without departing from the spirit of the invention.

While the drawing diagrammatically illustrates one form of printing mechanism with which the invention will be found useful, it will be apparent to those familiar with the art that the invention has wide application to printing and to auxiliary operations used in the printing industry. For example, in addition to its utility in guiding a web into a printing position, the features of the invention are also applied to guiding a web into slitting, folding, rewinding, creasing, blanking and embossing operations and, in fact, into equipment in which any type of operation is performed on the web after a pattern suitable for observation by the scanning mechanism herein provided has been printed or otherwise applied to the web. Its application to printing is, of course, not limited to the particular type of printing mechanism shown in Fig. 1. While particularly advantageous in rotogravure and letterpress work, the invention may likewise be applied to offset or any other type of printing on a continuous web, in which it is desirable to apply the printing in fixed relation to a suitable pattern previously applied to the web.

It is also entirely within the scope of the invention to utilize its features for the purpose of repositioning the member or mechanism which acts upon the web, in accordance with impulses transmitted from the scanner viewing the pattern previously applied to the web. For example, in a printing operation, instead of shifting the position of the web, to register a printed pattern viewed by the scanner with subsequent printing, the cylinder carrying the subsequent printing form may be moved into register with the pattern viewed by the scanner. This is known as cylinder compensation, as distinguished from web compensation, and suitable means for accomplishing both are well known in the art. Either type of compensation may, of course, also be used for registering the pattern viewed by the scanner with any subsequent operation such as slitting, folding, creasing, forming, blanking, embossing, and the like.

I claim:

1. A device to detect the lateral position of a moving web having on it such recurrent visible patterns that at least one longitudinal track of the web has at least one recurrent informative portion in which light reflection varies substantially for small lateral displacements of said track and at least one recurrent reference portion in which light reflection stays substantially unchanged for small lateral displacements of said track, comprising a single stationary photoelectric means generating signals as a function of light reflected from successive portions of said track passing in front of said stationary photoelectric means, monitoring means monitoring the passage of at least one informative portion of said track in front of said photoelectric means first storing means storing a first output corresponding to one extreme of all photoelectric signals generated by said photoelectric means, comparing means operatively connected to said photoelectric means and said monitoring means and generating a second output corresponding to the ratio between the photoelectric signals generated by said photoelectric means within one cycle monitored by said monitoring means and said first output of said first storing means, second storing means storing said second output provided by said comparing means and discharging means cancelling said information at a predetermined rate so that said second output stays above a predetermined value for a time duration depending on the lateral position of said web and controlling means controlling the lateral position of said web operatively connected to said second storing means thereby altering said lateral position during the periods of time said second output stays above said predetermined value.

2. A device for detecting the lateral position of a moving web relative a roller over which the web is passing, and including a source of light directed at the web to illuminate at least a part thereof, means providing recurrent light-reflective patterns which move relative to said source of light in a direction parallel with the longitudinal movement of the web in a single track, said patterns comprising an informative portion the reflective properties of which vary with the lateral relation between said roller and web, and a reference portion whose light reflective properties are substantially constant, photoresponsive means arranged to receive the reflections from both of said portions and providing a first signal having differing instantaneous values for the respective portions, an electronic amplifier having logarithmic characteristics and said first signal being applied to said electronic amplifier and providing thereby at least a second signal the amplitude of which is a function of the ratio between said instantaneous values, rectifying means receiving said second signal and establishing a first direct curent potential related to the maximum amplitude of said second signal, means establishing at least a second direct current potential related to certain predetermined values of said second signal, means comparing the direct current potentials including translating means and having elements connected for energizing the said translating means, but only in response to predetermined relationships existing between said direct current potentials in said comparing means.

3. A device as claimed in claim 2 in which the means which establishes the second direct current potential is a voltage divider with said second direct current potential at one of its taps, and the divider having a third direct current potential at another of said taps, and means are provided for adjusting the first direct current potential relative to the voltage divider potentials so that when the first direct current potential is greater than the second or less than the third, the comparing means will effect said elements to energize said translating means, but not otherwise.

4. A device as claimed in claim 2 in which said translating means comprises a meter for indicating said lateral position, and said comparing means is an electronic circuit having two balanced current producing parts with the two direct potentials connected to the respective parts and the meter connected across the parts.

5. A device as claimed in claim 2 in which means are provided to render the device operative only during the passage of selected portions of said web.

6. A device as claimed in claim 2 in which the said track is on the edge of said web, and a portion of the means providing said recurrent patterns comprises a member fixed relative to said web.

7. A device as claimed in claim 2 in which the said track is on the edge of the said web and at least a portion of the means providing said recurrent patterns comprises indicia on said roller.

8. A device as claimed in claim 3 in which a potential storage device is connected with said rectifying means and said first direct current potential comprises a charge of said storage device, said comparing means including two electronic devices having said first potential applied to both and said second and third potentials applied respectively in balance, said translating means comprising relays, one in the output of each electronic device.

9. A device for detecting the lateral position of a moving web relative to a roller over which the web is passing, and including a source of light directed at the web to illuminate at least a part thereof, means providing recurrent light reflective patterns comprising an informative portion the reflective properties of which vary with the lateral relation between said roller and web, and a reference portion whose light reflective properties are substantially constant, photo-responsive means arranged to receive the reflections from both of said recurrent patterns, electronic amplifying means having the output from the photo-responsive means connected to the input thereof and providing at its output a first signal which follows the variations of the output of the photo-responsive means, two electronic comparison circuits each including a pair of control terminals and each having an output circuit including a translating device, the control terminals of each pair normally being at potentials relative one another whereby no current flows in the output circuit and the translating devices are inoperative, means connected to the output of the electronic amplifying means for converting said first signal to a first control potential which is directly related to the maximum amplitude of said first signal and connected to one of each pair of terminals, sources of second control potentials of substantially constant values related to certain predetermined values of said first control potential connected respectively to the second of each pair of terminals, one translating device being rendered operative when the first control potential attains a value higher than the second control potential applied to the second terminal of one pair, and the second translating device being rendered operative when the first control potential attains a value lower than the second control potential applied to the second terminal of said second pair.

10. A device as claimed in claim 9 in which a condenser is provided to retain said first control potential for a period of time after said first signal has occurred, and bleed-off means are connected to discharge the condenser to some neutral value, whereby the total time that a charge causing energization of a translating device will remain on said condenser will depend upon the value of the maximum amplitude of said first signal.

11. A device to automatically correct the lateral position of a moving web having on it such recurrent patterns that at least one longitudinal track of said web has at least one recurrent informative portion in which light reflection varies substantially for small lateral displacements of said track and at least one recurrent reference portion in which light reflection stays substantially unchanged for small lateral displacements of said track of an amount equal to or beyond the extreme values of light reflection in the informative portions within the range of possible lateral shift of said track due to lateral movement of said web, comprising photoelectric means stationary relative to the web and a source of light directed at the web and reflecting substantially a single beam to said photoelectric means, said photo-electric means having a signal output varying between two amplitudes, each being proportional to the reflection from the respective recurrent portions of said one longitudinal track, an amplifier connected to said photo-electric means to have the output of said photoelectric means applied thereto, and biased to produce an output signal proportional to the ratio between the extreme values of the amplitudes of the signal output of said photoelectric means, and comparing means connected to the amplifier responsive to the output thereof.

References Cited in the file of this patent

UNITED STATES PATENTS

| | | |
|---|---|---|
| 2,203,706 | Stockbarger | June 11, 1940 |
| 2,220,737 | Jones | Nov. 5, 1940 |
| 2,517,554 | Frommer | Aug. 8, 1950 |
| 2,566,399 | Bishop | Sept. 4, 1951 |
| 2,583,580 | Ludwig | Jan. 29, 1952 |
| 2,643,117 | Frisbie et al. | June 23, 1953 |